Figures 1, 2:
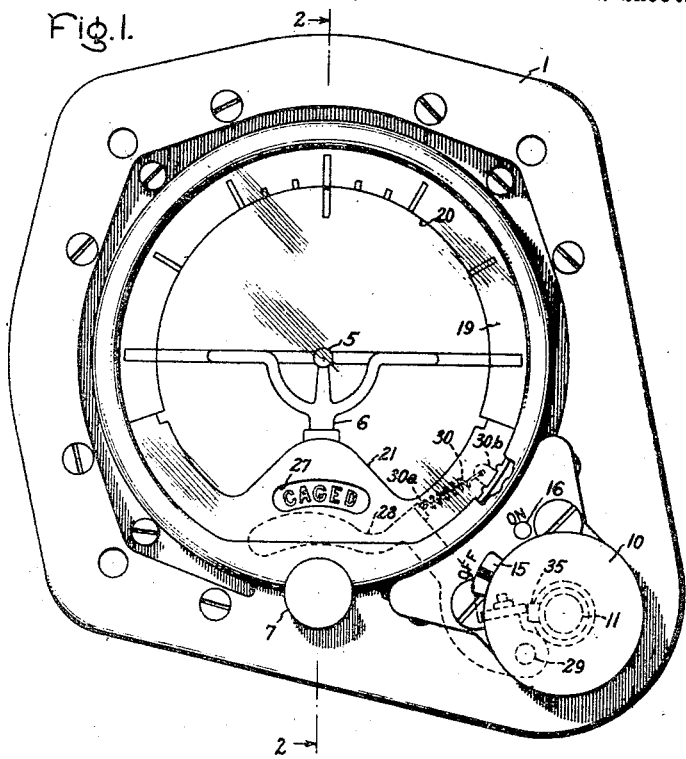

April 29, 1947.   R. E. WIGGIN ET AL   2,419,928
CAGING SIGNAL DEVICE FOR GYROSCOPES
Filed Sept. 5, 1945   2 Sheets-Sheet 1

Inventors:
Rinaldo E. Wiggin,
Harry G. Swanson,
by
Their Attorney.

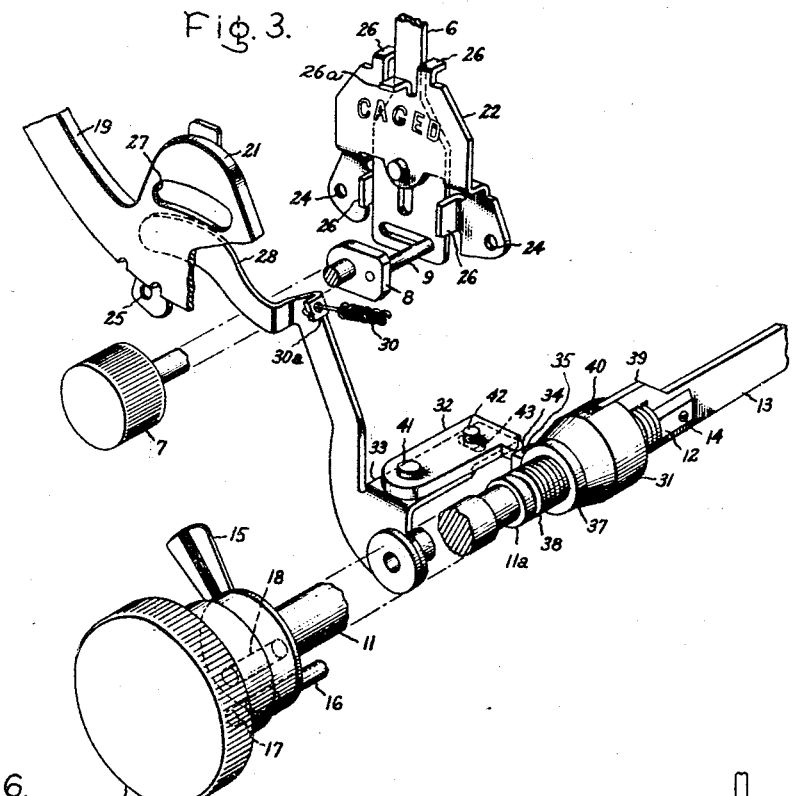

Patented Apr. 29, 1947

2,419,928

UNITED STATES PATENT OFFICE 2,419,928

CAGING SIGNAL DEVICE FOR GYROSCOPES

Rinaldo E. Wiggin, Saugus, and Harry G. Swanson, Watertown, Mass., assignors to General Electric Company, a corporation of New York Application September 5, 1945, Serial No. 614,510

9 Claims. (Cl. 116—124)

The present invention relates to gyroscopes, and more particularly to an improved signal arrangement for indicating the position of the caging mechanism used to centralize the gyroscope.

Gyroscopic flight instruments such as, for example, artificial horizons, are usually provided with a caging mechanism for centralizing the gyroscope and its supporting gimbal relative to the instrument case. In a conventional arrangement, the caging mechanism is controlled by a knob located on the face of the instrument, the knob being mounted on a shaft which is rotated between caged and uncaged positions to operate the caging mechanism. In order to insure that the caging mechanism will not drift between the caged and uncaged positions, a locking means is provided which positively holds the mechanism in either the caged or uncaged positions, the locking means being disengaged by the operator by an outward axial movement of the knob and shaft prior to rotation. During the uncaging movement of the knob it is imperative that the operator move the knob to a completely uncaged position so that the locking means becomes effective as otherwise the caging mechanism may drift back to an intermediate position and restrict the free movement of the gyroscope preventing proper operation of the instrument. Since gyroscopic instruments are frequently relied upon to inform the pilot of the attitude of the aircraft during blind flying operations, it is obvious that this would be a dangerous condition if not prevented. Furthermore, during the caging operation it is important that the operator move the caging knob to the completely caged position where the locking means again becomes effective as otherwise the caging mechanism may drift back from the caged position and permit a damaging movement of the gyroscope during violent maneuvers.

Accordingly, it is an object of the present invention to provide a caging signal indicator which not only informs the operator of the position of the caging mechanism but also gives a warning signal if the operator fails to lock the mechanism in either the caged or uncaged position.

A further object of the invention is to provide a caging signal indicator which is simple, has a neat appearance, and which can be easily adjusted.

Further objects and advantages of our invention will become apparent, and our invention will be better understood from the following description referring to the accompanying drawings, and the features of novelty which characterize our invention will be pointed out with particularity in the claims annexed to and forming a part of this specification.

In the drawings, Fig. 1 is a front elevation view of a horizon gyroscope flight instrument in which the caging signal indicator of the present invention has been embodied, the signal indicator being shown in the position representing the locked position of the caging mechanism; Fig. 2 is a sectional side elevation view of the front portion of the instrument shown in Fig. 1; Fig. 3 is a perspective view showing constructional details of the signal indicator; Fig. 4 shows details of the indicator actuating cam and cam follower; Fig. 5 shows the position of the signal indicator when the caging mechanism is in the unlocked position; and Fig. 6 shows the position of the indicator when the caging mechanism is locked in the uncaged position.

Referring to the drawing, the caging signal indicator of the present invention has been shown as being embodied in a conventional gyroscopically actuated flight instrument known as a horizon gyroscope. The horizon gyroscope comprises a face plate 1 which is adapted to be mounted on the instrument panel of an aircraft so that a window 2, through which indications of the instrument are observed, faces the pilot or other observer. Indications of the pitch and bank attitudes of the aircraft are provided by means of a horizon bar 3 which moves vertically in front of a background member or sky plate 4 in accordance with the pitch attitude of the aircraft and which rotates with the sky plate, relative to the instrument case, in accordance with the bank attitude of the aircraft. The horizon bar 3 and the background member are actuated by means of a vertical axis gyroscope, the showing of which has been omitted since the construction is entirely conventional and well known and forms no part of the present invention. Pitch and bank movements of the horizon bar 3 are gauged by reference to a miniature simulated airplane 5 which is mounted in front of the horizon bar on a vertically adjustable support 6. The pitch datum reference of the instrument is adjusted by means of a knob 7 which, when rotated, vertically positions the support 6 of the miniature airplane 5 by means of a known mechanism comprising a crank 8 which, when rotated by the knob 7, causes a projecting pin 9 to vertically position the sliding support 6.

The instrument is provided with a caging knob 10 mounted on a rotatable shaft 11 which extends through a suitable shaft opening in the lower righthand portion of the face plate 1. The inner end of the shaft 11 is provided with a slotted end portion 12 into which is received one end of a rectangular-shaped caging shaft 13, the shafts 11 and 13 being held together by means of a screw 14. The other end of the shaft 13 is connected to the caging mechanism of the gyroscope, the showing of which has been omitted as it forms no part of the present invention. For details of the caging mechanism, reference may be had to Patent 2,366,721—Gabrielson, in which the caging shaft 50 corresponds to the shaft 13 of the subject invention. As fully described in the above-mentioned Gabrielson patent, when the knob 10 is rotated clockwise to the caged position shown in Fig. 1 of the drawing, two caging arms or jaws rotate to a position in which they engage a pair of pins extending from the gyro bearing frame and from the outer gimbal, the pins being moved to a position in which the gyro and the gimbal are centralized relative to the case. When the caging knob 10 is rotated counterclockwise from the position shown in Fig. 1 to the uncaged position, the caging jaws move away from the pins leaving the gyro free for universal movement relative to the case. In the uncaged position an indicating tab 15 attached to the knob 10 engages a stop pin 16 projecting from the front of the instrument after a rotation of the shaft 11 of about 300 degrees from the caged position.

As pointed out above, it is important to prevent any drifting of the caging mechanism between the caged and the uncaged positions and, to prevent this, a locking arrangement is provided for positively restraining the caging mechanism in either the caged or uncaged position. In the illustrated arrangement, the locking of the caging mechanism is accomplished by means of an indexing pin 16 which projects from the front face of the instrument and is received in either of two holes 17 and 18 provided in the rear face of the caging knob 10. Thus, as shown in Fig. 3 of the drawing, when the caging knob is in the clockwise caged position, the indexing pin 16 extends into the hole 17 and locks the caging mechanism in this position by preventing rotation of the caging knob. When it is desired to unlock and uncage the gyro, the caging knob 10 is first pulled outwardly a sufficient distance to move the pin 16 out of the hole 17. A stop 11a on shaft 11 then engages stationary stop means 11b and prevents further withdrawal of the knob. The knob 10 can then be rotated in a counterclockwise direction to the fully uncaged position in which the hole 18 lies opposite the indexing pin. The caging knob is then moved inwardly so that the indexing pin enters the hole 18 and acts to lock the caging mechanism in the uncaged position. Preferably a suitable biasing spring (not shown) is provided to urge the caging shaft 13 and caging knob 10 to the inner locked position whenever the caging knob is moved to a position in which the indexing pin 16 lies in registration with either of holes 17 or 18. The procedure for unlocking and caging is the same except that the caging knob is rotated in the clockwise direction.

According to the present invention a novel signal indicator is provided for indicating to the pilot or other observer when the caging mechanism is in the completely caged or the completely uncaged position, and also for giving a warning signal if the mechanism fails to lock in either position. Such a failure to lock may occur, for example, if the operator fails to rotate the caging knob far enough for the hole 17 or 18 to move into registration with the indexing pin 16.

The instrument has a dial plate 19 provided with a circular opening 20 through which the movements of the horizon bar are observed. The dial plate 19 has the usual upwardly projecting tongue portion 21 extending from the lower edge which acts to cover the mechanism previously described for vertically positioning the sliding support 6 for the miniature simulated airplane 5. Mounted directly in back of the tongue 21 is an indicator plate 22, the indicator plate being held in position by two screws 23 (only one of which is shown) which are screwed into threaded openings in the face plate 1. The screws 23 pass through holes 24 in the indicator plate, and also pass through holes in downwardly projecting lugs 25 on the dial plate 19 so that the indicator plate and dial plate are fastened together in proper alignment. The indicator plate is provided with bent lugs 26 which advantageously serve as guides for the vertically slidable support 6. Also the indicator plate has a forwardly bent lug 26a which bears against the backside of the tongue 21 and acts as a spacer to provide a space between the indicator plate and the tongue, the purpose of which will become apparent as the description proceeds. The front side of the indicator plate 22 is provided with suitable indicia such as the word "caged," which may be painted or otherwise marked on the plate. The indicia on the plate 22 is arranged to lie directly in back of a window 27 provided in the tongue 21 of the dial plate 19. Thus when the instrument is observed from the front and when the window 27 is unobstructed, the word "caged" appears in the window as shown in Fig. 1 of the drawing.

Mounted for movement in the above-mentioned space provided between the tongue 21 and the indicator plate 22 is a shutter member 28. As shown, the shutter member 28 comprises a bent lever, the lower end of which is pivoted on a bearing pin 29 so that the other end of the shutter member is free to pivot to positions in which it wholly or partly masks or completely unmasks the indicia on the indicator 22. The shutter member 28 is biased by means of a tension spring 30 which extends between a bent lug 30a on the shutter member and a lug 30b on the dial plate 19. Tension spring 30 biases the shutter member 28 to the upper completely masked position shown in Fig. 6 of the drawings, and a cam arrangement, which will now be described, is provided for moving the shutter member downward to the partially unmasked position shown in Fig. 5, and further downward to the completely unmasked position shown in Fig. 1 at appropriate times to indicate the condition of the caging mechanism.

The cam arrangement for operating the shutter member 28 comprises a three-level cam 31 mounted on the caging knob shaft 11 and a cam follower member 32 mounted on a right angle projection 33 extending inwardly from the lower portion of the shutter member. The cam follower 32 has a projection 34 which is adapted to engage any one of three different levels on the cam 31, depending upon the rotary and axial positions of the shaft 11. When the caging knob 10 and the shaft 11 are rotated to the clockwise caged position, and also are moved axially to the inner locked position in which the indexing pin 16 extends into the hole 17, the projection 34 bears against a raised surface 35 of the cam 31. This causes rotation of the shutter member 28 to the lowermost position, unmasking the indicator plate 22 so that the word "Caged" appears in the window 27 as shown in Fig. 1 of the drawing. When the caging knob and shaft 11 are pulled outwardly to disengage the pin 16 from the hole 17, thereby unlocking the caging mechanism prior to a rotary uncaging movement, the cam follower projection 34 rides down to an intermediate cylindrical cam surface 36 of the cam member 31. This permits the tension spring 30 to pivot the shutter member 28 upwardly to the position shown in Fig. 5 of the drawing in which the shutter member partially masks the indicator 22 as shown. In this manner a signal is produced which warns the operator that the caging mechanism has been unlocked and is apt to drift if left in this position.

During the rotary uncaging movement of the shaft 11, the cam follower projection 34 simply rides around on the cylindrical cam surface 36, producing no change in the position of the shutter member. Thus whenever the caging mechanism is unlocked, the shutter member occupies the intermediate, partially masked position regardless of the rotary position of shaft 11. By way of example, the shaft 11 is shown in an intermediate position in Fig. 5. When the shaft 11 reaches the fully uncaged position so that the hole 18 in the caging knob lies in registration with the indexing pin 16, and thereby permits the shaft 11 to be moved inwardly to the locked position, the shaft 11 and the cam 31 move inwardly, whereby the cam follower projection 34 ridges downwardly to a third or innermost cam lever surface 37. This permits the tension spring 30 to move the shutter member 28 to the uppermost position in which the shutter member completely masks the indicator 22, as shown in Fig. 6 of the drawing. In this manner a signal is produced, or rather the word "Caged" does not appear in the window 27, thus indicating to the operator that the instrument is locked in the uncaged position and therefore is in proper condition for use.

In order to provide a convenient means for adjusting the caging signal indicator so that it indicates properly, two adjustments are provided, one being associated with the cam member 31 and the other being associated with the cam follower 32. The cam member 31, which is generally cylindrical in shape, is provided with a threaded bore which receives in threaded engagement a threaded end portion 38 of the shaft 11. By screwing the cam member 31 in and out on the shaft 11, the cam member may be easily adjusted so that the cam surfaces 35, 36 and 37 will fall into proper axial alignment with the cam follow-up projection 34. A projection or key 39 on the caging shaft 13 extends into a slot 40 in the cam member 31 and prevents an unscrewing of the cam after the adjustment has been made. When it is desired to adjust the cam, the screw 14 is removed to permit withdrawal of the key 39 from the slot 40. After adjustment, the cam member 31 is turned so that the slot 40 is in a position to receive the key 39 and the shafts 13 and 11 are then engaged and reconnected by inserting the screw 14.

In order to provide means for initially adjusting the position of shutter member 28 relative to the window 27, a second adjustment is provided for varying the relative positions of the cam follower 32 and its support 33. To accomplish this, one end of the cam follower 32 is pivoted on the support 33 by means of a pivot pin 41 so that the cam follow-up projection 34 can be moved towards or away from the cam member 31. When the proper distance from the cam has been obtained, which gives a proper position of the shutter member 28, the cam follower 32 is fastened to the support 33 by means of a set screw 42. A slot 43 provided in the support 33 permits the desired adjusting movement of the cam follower 32 prior to the tightening of the set screw.

The caging signal indicator adjusting arrangement described above is particularly advantageous in that it provides a compensating adjustment which will accommodate a relatively large range of tolerance accumulation on component parts, thus permitting economies in manufacture.

In addition to the adjustment features mentioned above, the design of the caging signal indicator of the present invention has several other marked advantages. Thus it will be noted that the word "Caged" on the indicator plate 22 is fixed relative to the dial window 27 and for that reason is always symmetrically located in the window regardless of the tolerance accumulation on the moving component parts so that a neat appearance is assured. Furthermore it will be noted that the mechanical action of the shutter member 28 is so designed that in the event of failure of the return spring 30, the word "Caged" automatically becomes visible, thus warning of the defect. A still further advantage is the fact that the caging signal indicator which is located in the tongue 21 has a prominent location so that it will easily and quickly catch the eye of the observer, and yet at the same time it is positioned so that it cannot possibly interfere with the movement of the horizon bar 3 in the dial opening 20.

Thus it will be seen that there has been provided in accordance with the present invention a novel caging signal indicator for a gyroscopic flight instrument which is simple in construction, neat in appearance, easily adjusted, and which provides a striking indication not only of the caged and uncaged positions of the caging mechanism, but also provides an additional signal which warns the operator in case he fails to properly lock the caging mechanism in either the uncaged or caged position.

While we have shown and described particular embodiments of our invention, it will occur to those skilled in the art that various changes and modifications may be made without departing from our invention, and we therefore aim in the appended claims to cover all such changes and modifications as fall within the true spirit and scope of our invention.

What we claim as new and desire to secure by Letters Patent of the United States is:

1. In combination with a gyroscope having a caging mechanism operated by a shaft movable between caged and uncaged positions, a stationary indicator having indicia thereon, a shutter mounted for movement in front of said indicator to mask and unmask said indicia and means actuated by said shaft for positioning said shutter.

2. In a flight instrument of the gyroscopically actuated type having a gyroscope gimballed in a case and a caging mechanism for centralizing said gyroscope relative to said case, a dial plate associated with said instrument, said dial plate having a window therein, a stationary indicator mounted in back of said dial plate and having indicia thereon opposite said window, a shutter movable between said dial plate in said indicator to mask and unmask said indicia, and means responsive to operation of said caging mechanism for positioning said shutter.

3. In a flight instrument of the gyroscopically actuated type having a gyroscope gimballed in a case and caging mechanism for centralizing said gyroscope relative to said case, a dial plate associated with said instrument, said dial plate having a window therein, a stationary indicator mounted in back of said dial plate and having indicia thereon opposite said window, a shutter member pivoted to move between said dial plate and said indicator to positions in which said indicia is either masked or unmasked, a spring for biasing said shutter member to the masked position and cam means actuated by said caging mechanism for moving said shutter against the bias of said spring to the unmasked position.

4. In combination with a gyroscope having a caging mechanism operated by a shaft rotatable between caged and uncaged positions and movable axially in either of said positions to effect a locking or unlocking of said mechanism, a stationary indicator having indicia thereon, a shutter mounted for movement in front of said indicator to mask and unmask said indicia, and means actuated by movement of said shaft for positioning said shutter, said means being constructed and arranged so that when said shaft is moved axially to unlock said mechanism in one of said positions said shutter is moved to partially unmask said indicia and when said shaft is moved axially in the other of said positions said shutter is moved to completely unmask said indicia.

5. In combination with a gyroscope having a caging mechanism operated by a shaft rotatable between caged and uncaged positions and movable axially in either of said positions to effect a locking or unlocking movement of said mechanism, a stationary indicator having indicia thereon, a shutter member mounted to move in front of said indicator to mask and unmask said indicia, a cam member mounted on said shaft, a cam follower connected to actuate said shutter member and adapted to engage said cam member, said cam being shaped so that when said shaft is moved axially to unlock said mechanism in one of said positions said shutter is moved to partially unmask said indicia when said shaft is moved axially to lock said mechanism in the other of said positions said shutter is moved to completely unmask said indicia.

6. In a caging signal indicator for a gyroscopic instrument having a caging mechanism operated by a shaft rotatable between caged and uncaged positions and movable axially in either of said positions for locking or unlocking said mechanism, a three-level cam mounted on said shaft, a cam follower biased into engagement with said cam, and a three-position caging signal indicator actuated by said follower, said cam being shaped such that when said shaft is moved axially in one direction to unlock said mechanism in said caged position said follower moves from a first cam level to a second cam level and when said shaft is moved axially in the opposite direction to lock said mechanism after being rotated to said uncaged position said follower moves from said second cam level to a third cam level.

7. In a caging signal indicator for a gyroscopic instrument having a caging mechanism operated by a shaft rotatable between caged and uncaged positions and movable axially in either of said positions for locking or unlocking said mechanism, a three-level cam mounted on said shaft, a cam follower biased into engagement with said cam, and a three-position caging signal indicator actuated by said follower, said cam being shaped such that when said shaft is moved axially in one direction to unlock said mechanism in said caged position said follower moves from a first cam level to a second cam level and when said shaft is moved axially in the opposite direction to lock said mechanism after being rotated to said uncaged position said follower moves from said second cam level to a third cam level, and screw means for axially adjusting said cam on said shaft to permit proper initial alignment of said cam levels with said cam follower.

8. In a caging signal indicator for a gyroscopic instrument having a caging mechanism operated by a shaft rotatable between caged and uncaged positions and movable axially in either of said positions for locking or unlocking said mechanism, a three-level cam mounted on said shaft, a cam follower biased into engagement with said cam, said cam being shaped such that when said shaft is moved axially in one direction to unlock said mechanism in said caged position said follower moves from a first cam level to a second cam level and when said shaft is moved axially in the opposite direction to lock said mechanism after being rotated to said uncaged position said follower moves from said second cam level to a third cam level, a dial plate associated with said instrument having a window therein, a stationary indicator mounted in back of said dial plate, said indicator having indicia thereon opposite said window, and a pivoted shutter member actuated by said cam follower so as to move between said dial plate and said indicator, said shutter acting to mask, partially unmask, or completely unmask the indicia on said indicator in accordance with the level of said cam engaged by said cam follower.

9. In a caging signal indicator for a gyroscopic instrument having a caging mechanism operated by a shaft rotatable between caged and uncaged positions and movable axially in either of said positions for locking or unlocking said mechanism, a three-level cam mounted on said shaft, a cam follower biased into engagement with said cam, said cam being shaped such that when said shaft is moved axially in one direction to unlock said mechanism in said caged position said follower moves from a first cam level to a second cam level and when said shaft is moved axially in the opposite direction to lock said mechanism after being rotated to said uncaged position said follower moves from said second cam level to a third cam level, a dial plate associated with said instrument having a window therein, a stationary indicator mounted in back of said dial plate, said indicator having indicia thereon opposite said window, a pivoted shutter member actuated by said cam follower so as to move between said dial plate and said indicator, said shutter acting to mask, partially unmask, or completely unmask the indicia on said indicator in accordance with the level of said cam engaged by said cam follower, and means for adjusting the relative positions of said cam follower and said shutter member for initially obtaining the proper relative positions of said shutter member and said indicator.

RINALDO E. WIGGIN.
HARRY G. SWANSON.

REFERENCES CITED

The following references are of record in the file of this patent:

UNITED STATES PATENTS

| Number | Name | Date |
|---|---|---|
| 2,360,935 | Carlson | Oct. 24, 1944 |